United States Patent [19]

Melvin et al.

[11] Patent Number: 4,642,983
[45] Date of Patent: Feb. 17, 1987

[54] CHEMICAL RELEASING FLASH SUPPRESSOR

[75] Inventors: William S. Melvin; Robert E. Betts, both of Huntsville; Lawrence B. Thorn, Madison, all of Ala.

[73] Assignee: The United States of America as represented by the Secretary of the Army, Washington, D.C.

[21] Appl. No.: 731,193

[22] Filed: May 6, 1985

[51] Int. Cl.⁴ ............................................. C06D 5/00
[52] U.S. Cl. ..................................... 60/219; 102/291
[58] Field of Search ...................... 60/218, 219, 220; 102/291

[56] References Cited

U.S. PATENT DOCUMENTS

| | | | |
|---|---|---|---|
| 3,140,582 | 7/1964 | Tyson, Jr. | 60/219 X |
| 3,696,616 | 10/1972 | Lucas et al. | 60/219 X |
| 3,742,710 | 7/1973 | Trowbridge | 60/220 |
| 4,045,261 | 8/1977 | Baczuk | 149/19.8 |
| 4,052,943 | 10/1977 | Elrick | 102/290 X |
| 4,157,270 | 6/1979 | Martignoni et al. | 60/219 X |
| 4,165,247 | 8/1979 | Brew et al. | 149/20 X |
| 4,223,606 | 9/1980 | Bornstein | 102/374 |
| 4,297,152 | 10/1981 | Frankel et al. | 149/88 |
| 4,411,717 | 10/1983 | Anderson | 149/19.9 X |

FOREIGN PATENT DOCUMENTS 6088804 12/1979 Japan ..................................... 60/219

Primary Examiner—Peter A. Nelson
Attorney, Agent, or Firm—John C. Garvin, Jr.; Freddie M. Bush

[57] ABSTRACT

A method and design are disclosed for the introduction of ammonia gas into the rocket motor gas environment wherein the ammonia gas functions to suppress the flash signature.

The firing and pressurization of a sealed container having suppressant vents results in the rupturing of one or more seals for the container containing clathrate means from which adsorbed liquid or gaseus ammonia is boiled out and discharged and mixed with combustion gases prior to being discharged through the exhaust nozzle of a rocket motor.

The design for the container for containing clathrate means include as part of one embodiment a toroidal shaped container for installing within the rocket motor exhaust nozzle wherein the container functions as the throat of the exhaust nozzle of the rocket motor. Other embodiments feature the clathrate means in a sealed container which additionally houses the ignitor means. The combination ignitor-clathrate means container is provided with a seal which ruptures when the ignitor means is fired, and the container is additionally provided with suppressant vents along the periphery and the end of the combination container through which the suppressant gas ammonia is boiled out of the clathrate means and subsequently discharged and mixed with rocket motor combustion gases prior to being exhausted through a rocket motor exhaust nozzle environment wherein the ammonia gas functions to suppress the flash signature.

6 Claims, 4 Drawing Figures

CHEMICAL RELEASING FLASH SUPPRESSOR

DEDICATORY CLAUSE

The invention described herein may be manufactured, used, and licensed by or for the Government for governmental purposes without the payment to us of any royalties thereon.

BACKGROUND OF THE INVENTION

Suppression of the flash signature of tactical rocket motors is a requirement which has partially been met with the employment of chemicals such as potassium sulphate ($K_2SO_4$) which can be mechanically placed in the gas stream and ablated to give the desired affect. Other approaches have included the incorporation of particles of $K_2SO_4$ in the propellant, but this degrades the propellant in performance and physical properties.

Therefore, for all systems which employ flash during ignition and burning, particularly, 2.75 rocket motors, SPIKE, etc., an improved method and design for flash suppression would be an advantgeous achievement, particularly, where it is desired to conceal the flash signatures from visual or electronic detection.

SUMMARY OF THE INVENTION

A more active flash suppressor for a rocket motor comprises gaseous or liquid ammonia adsorbed into molecular sieves.

Molecular sieves belong to a class of substances known as clathrates which fix gases or liquids by inclusion within their structures. The molecular sieves found to be useful in this invention are those which can adsorb ammonia in liquid or gaseous state.

In accordance with this invention, liquid or gaseous ammonia is adsorbed into a molecular sieve. The sieve is sealed in a container which prevents escapement of the adsorbed ammonia until at time of use.

The molecular sieve contained in a sealed container having a predetermined geometric configuration as determined by its installed position in a rocket motor yields gaseous ammonia as a result of its being boiled out of the molecular sieve to the gas stream flow after the container seal is broken by the gas pressure flow. Reaction then occurs between the ammonia gas suppressant and the rocket gases to produce the desired effects.

DESCRIPTION OF THE PREFERRED EMBODIMENT

The method and the designs of this invention allow the introduction of selected species of a chemical which functions to suppress the flash signature of a rocket motor.

Liquid or gaseous ammonia is adsorbed into molecular sieves which are sealed in a container having a predetermined geometric shape to fit a particular area of a rocket motor. The gas pressure flow from the ignitor and/or the rocket motor breaks the seals of the container and boils out the adsorbed suppressor agent where it reacts with the rocket gases to produce the desired effect. FIGS. 1-4 depict a number of embodiments for adaptation, particularly, a 2.75 rocket motor system such as SPIKE or all systems which produce flash. Suppressing of the flash for purposes of concealing and/or protection of personnel firing the type of a tactical weapon is a requirement for improvement in the areas noted.

Figure 1:
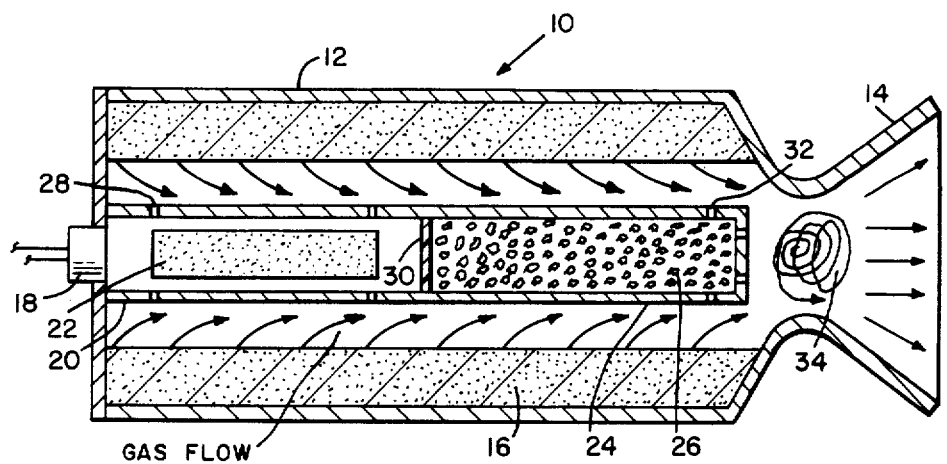
FIG. 1 of the drawing depicts a cylindrical shaped container for a molecular sieve with adsorbed ammonia contained as a part of the ignitor container within a rocket motor, FIG. 2 of the drawing depicts a toroidal shaped container for a molecular sieve with adsorbed ammonia positioned in a rocket motor wherein the toroidal shaped container functions as the throat, FIG. 3 of the drawing depicts a container with a molecular sieve with adsorbed ammonia wherein the container functions as a holder for the ignitor and the molecular sieve, and FIG. 4 of the drawing depicts a toroidal shaped container within a rocket motor which contains a molecular sieve with adsorbed ammonia which bridges a space between a rocket motor case and the exhaust nozzle.

In further reference to FIG. 1, a rocket motor 10 depicts a rocket motor case 12 with an exhaust nozzle 14 installed at the aft end thereof and containing a propellant charge 16 within the rocket motor case. At the forward end of the rocket motor, an initiator 18 having an ignitor container 20 with an ignitor charge 22 contained within the case is shown in communication with a container 24 for a molecular sieve with adsorbed ammonia 26 contained within the ignitor container. Ignitor vents 28 allow the gases produced from the ignitor charge, after the initiator is fired, to escape through the ignitor vents to ignite the propellant charge. A seal 30 separating the molecular sieve and the ignitor charge is ruptured to expell the suppressor gas ammonia through suppressant vents 32 to mix with rocket motor gases to provide the desired effect in the suppressant mixing zone 34 as the gases are being exhausted through the exhaust nozzle.

Figure 2:
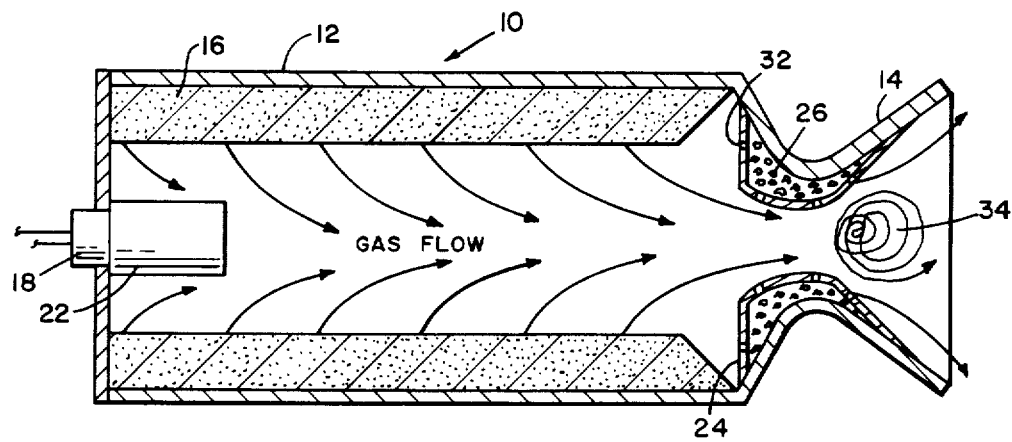

In FIG. 2, wherein like numerals as assigned for like components in FIG. 1 are shown, a toroidal container 24 for the molecular sieve with adsorbed ammonia 26 is depicted as a portion of the rocket throat. When the rocket motor gases rupture the toroidal container seal, suppressor gases are expelled through the suppressant vents 32 to mix with rocket motor gases to provide the desired effect in the suppressant mixing zone 34 as the gases are being exhausted through the exhaust nozzle.

Figure 3:
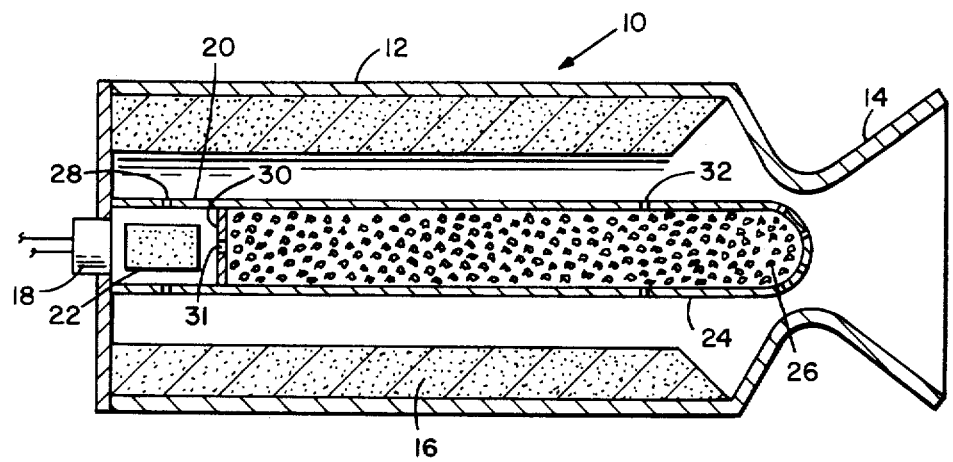

In FIG. 3, wherein like numerals as assigned for like components in FIGS. 1-2 are shown, seal 30 with vent 31 between ignitor and molecular sieve allows the ignitor gases to release the adsorbed ammonia from the molecular sieve and expell the released ammonia gas through suppressant vents 32 to mix with rocket motor gases to provide the desired effect in the suppressant mixing zone 34 as the gasses are being exhausted through the exhaust nozzle.

Figure 4:
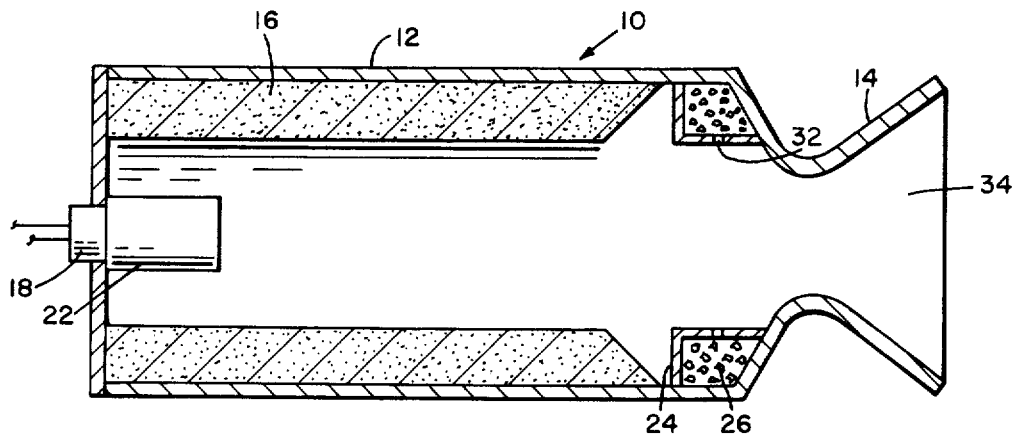

In FIG. 4, wherein like numerals as assigned for like components in FIGS. 1-3 are shown, a toroidal shaped container 24 within the rocket motor which contains a molecular sieve with adsorbed ammonia bridges a space between a rocket motor case and the exhaust nozzle. The toroidal shaped container seal is ruptured, suppressant gases are boiled off from the molecular sieve, and the suppressant gases are expelled through suppressant vents 32 to mix with rocket motor gases to provide the desired effect in the suppressant mixing zone 34 as the gases are being exhausted through the exhaust nozzle.

We claim:

1. In combination with a rocket motor comprised of a rocket motor case having a forward end and an aft end; a solid propellant grain contained within said rocket motor case; ignitor means positioned within said rocket motor case for igniting said solid propellant grain to produce combustion gases; an exhaust nozzle secured at the aft end of said rocket motor case for exhausting said rocket motor combustion gases; and additionally comprising clathrate means with a source of ammonia gas included therein, said clathrate means with the included source of ammonia gas contained within a sealed container whereupon firing said ignitor means for igniting said solid propellant grain a subsequent pressurization and flowing of said combustion gases achieve rupturing of said sealed container and releasing of said ammonia gas by boiling said ammonia gas off from said clathrate means for containing said source of ammonia gas, said ammonia gas being mixed with said combustion gases in a mixing zone within said rocket motor wherein said ammonia gas functions as a flash suppressor for said combustion gases exiting said exhaust nozzle.

2. The combination as defined in claim 1 wherein said clathrate means comprises a molecular sieve with absorbed ammonia.

3. The combination as defined in claim 2 wherein said sealed container is an integral part of a container containing said rocket motor case and wherein said sealed container is provided with a seal between said ignitor charge of said ignitor means and said molecular sieve and suppressant vents in the periphery of said ignitor container.

4. The combination as defined in claim 3 wherein said ignitor container is provided with suppressant vents on the end surface of said ignitor container to achieve discharging of ammonia gases toward a mixing zone near said exhaust nozzle where mixing of said ammonia and said combustion gases take place prior to exiting through said exhaust nozzle.

5. The combination as defined in claim 2 wherein said sealed container is a torodial shaped container positioned within the exhaust nozzle wherein said torodial shaped container functions as the throat of said rocket exhaust nozzle, and wherein said torodial shaped container is provided with a plurality of suppressant vents along said throat of said rocket exhaust nozzle.

6. The combination as defined in claim 2 wherein said sealed container is a torodial shaped container positioned within said rocket motor case in an area defined by the terminal portion of said solid propellant grain and said rocket exhaust nozzle, and wherein said torodial shaped container is provided with a plurality of suppressant vents.

* * * * *